(12) United States Patent
Sasaki

(10) Patent No.: US 11,230,255 B2
(45) Date of Patent: Jan. 25, 2022

(54) VEHICLE POP-UP HOOD APPARATUS

(71) Applicant: HONDA MOTOR CO., LTD., Tokyo (JP)

(72) Inventor: Kazutada Sasaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 16/750,015

(22) Filed: Jan. 23, 2020

(65) Prior Publication Data

US 2020/0262386 A1 Aug. 20, 2020

(30) Foreign Application Priority Data

Feb. 19, 2019 (JP) .............................. JP2019-027710

(51) Int. Cl.
| | |
|---|---|
| *B60R 21/38* | (2011.01) |
| *E05B 77/08* | (2014.01) |
| *E05B 83/24* | (2014.01) |
| *B62D 25/12* | (2006.01) |

(52) U.S. Cl.
CPC .............. *B60R 21/38* (2013.01); *E05B 77/08* (2013.01); *E05B 83/24* (2013.01); *B62D 25/12* (2013.01)

(58) Field of Classification Search
CPC . B60R 21/38; B60R 2021/0004; E05B 83/24; E05B 83/18; E05B 77/08; E05B 81/02; E05B 77/02; E05B 51/023; B62D 25/12; B62D 25/105
See application file for complete search history.

(56) References Cited

U.S. PATENT DOCUMENTS

| | | | | | |
|---|---|---|---|---|---|
| 3,386,683 | A | * | 6/1968 | Howland ............... | B64D 25/02 242/374 |
| 4,456,289 | A | * | 6/1984 | Badiali ................... | E05B 83/24 292/125 |
| 4,746,153 | A | * | 5/1988 | Compeau ................ | E05B 81/22 292/216 |
| 4,991,884 | A | * | 2/1991 | Cairns ..................... | E05B 83/24 292/28 |
| 5,000,493 | A | * | 3/1991 | Bastien ................... | E05B 83/24 292/11 |

(Continued)

FOREIGN PATENT DOCUMENTS

JP 2017-124703 7/2017

*Primary Examiner* — Paul N Dickson
*Assistant Examiner* — Timothy Wilhelm
(74) *Attorney, Agent, or Firm* — Amin, Turocy & Watson, LLP

(57) ABSTRACT

A pop-up hood apparatus includes a hood, a hood lock mechanism, a support mechanism of the hood lock mechanism, and an actuator that displaces the hood lock mechanism upward. The support mechanism includes a movable block that supports the hood lock mechanism and a base block and that supports the movable block such that the movable block is slidable upward and downward. The base block has a long hole that extends along a vertical direction. A protrusion part that is slidably inserted in the long hole is provided on the movable block. A resistance-applying part that comes into contact with the protrusion part and that applies a resistance to the protrusion part is provided in at least a higher region of the long hole than a required elevation position of the hood.

5 Claims, 8 Drawing Sheets

(56) References Cited

U.S. PATENT DOCUMENTS

| | | | | |
|---|---|---|---|---|
| 5,141,265 A * | 8/1992 | Claar | E05B 83/24 | 292/100 |
| 5,172,945 A * | 12/1992 | Doherty | E05B 17/0037 | 292/47 |
| 5,222,775 A * | 6/1993 | Kato | E05B 81/14 | 292/201 |
| 5,411,302 A * | 5/1995 | Shimada | E05B 81/14 | 292/201 |
| 5,429,400 A * | 7/1995 | Kawaguchi | E05B 81/22 | 292/201 |
| 5,445,421 A * | 8/1995 | Ferrara | E05B 83/24 | 292/216 |
| 6,217,108 B1 * | 4/2001 | Sasaki | B60R 21/013 | 180/274 |
| 6,345,679 B1 * | 2/2002 | Sasaki | B60R 21/38 | 180/271 |
| 6,415,882 B1 * | 7/2002 | Schuster | B60R 21/38 | 16/223 |
| 6,581,987 B1 * | 6/2003 | Gentile | E05B 83/24 | 292/216 |
| 6,755,268 B1 * | 6/2004 | Polz | B60R 21/34 | 180/69.21 |
| 6,837,535 B2 * | 1/2005 | Plesternings | B60J 7/143 | 296/107.17 |
| 7,195,090 B2 * | 3/2007 | Parks | B60R 21/38 | 180/271 |
| 7,296,325 B1 * | 11/2007 | Putumbaka | E05D 3/02 | 16/348 |
| 7,303,040 B2 * | 12/2007 | Green | B60R 21/38 | 180/274 |
| 7,475,752 B2 * | 1/2009 | Borg | B60R 21/38 | 180/274 |
| 7,537,073 B2 * | 5/2009 | Kalliske | B60R 21/38 | 16/222 |
| 7,559,399 B2 * | 7/2009 | Lewis | B60R 21/38 | 180/274 |
| 7,766,397 B2 * | 8/2010 | Carabalona | E05B 81/14 | 292/201 |
| 7,896,122 B2 * | 3/2011 | Borg | B62D 25/12 | 180/274 |
| 7,934,293 B2 * | 5/2011 | Kalargeros | B60R 21/38 | 16/369 |
| 8,069,943 B2 * | 12/2011 | Takahashi | B60R 21/38 | 180/274 |
| 8,579,068 B2 * | 11/2013 | Farooq | E05B 77/08 | 180/274 |
| 8,584,787 B2 * | 11/2013 | Hwang | B60R 21/38 | 180/274 |
| 8,596,706 B2 * | 12/2013 | McGuire | E05B 81/36 | 296/76 |
| 8,628,127 B2 * | 1/2014 | Prasad | E05B 83/24 | 292/220 |
| 8,768,574 B1 * | 7/2014 | Shaw | B60R 21/38 | 701/45 |
| 8,801,101 B2 * | 8/2014 | Dagcioglu | B60N 2/3022 | 297/331 |
| 9,027,971 B2 * | 5/2015 | Barczynski | E05B 83/24 | 292/100 |
| 9,145,716 B2 * | 9/2015 | Jayasuriya | E05B 83/24 | |
| 9,222,288 B2 * | 12/2015 | Townson | E05B 79/04 | |
| 9,366,066 B2 * | 6/2016 | Hwang | E05D 11/00 | |
| 9,382,731 B2 * | 7/2016 | Kim | E05B 83/243 | |
| 9,487,983 B2 * | 11/2016 | Choi | E05D 11/1014 | |
| 9,637,082 B2 * | 5/2017 | Ferri | B60R 21/38 | |
| 9,644,404 B2 * | 5/2017 | Strole | E05B 81/20 | |
| 9,701,277 B2 * | 7/2017 | McIntyre | B60R 21/38 | |
| 9,751,493 B2 * | 9/2017 | Narita | B60R 21/38 | |
| 9,764,711 B2 * | 9/2017 | Narita | E05D 7/086 | |
| 9,963,103 B2 * | 5/2018 | Nomura | B62D 25/105 | |
| 10,035,490 B2 * | 7/2018 | Kim | B60R 21/0136 | |
| 10,118,587 B2 * | 11/2018 | Czechtizky | E05D 3/06 | |
| 10,272,003 B2 * | 4/2019 | Zindler | B62D 33/037 | |
| 10,309,130 B2 * | 6/2019 | Schiffer | E05B 81/44 | |
| 10,336,291 B2 * | 7/2019 | Schabenberger | B62D 25/12 | |
| 10,370,876 B2 * | 8/2019 | Farrenkothen | E05B 83/00 | |
| 10,434,974 B2 * | 10/2019 | Henck | E05B 77/08 | |
| 10,584,521 B2 * | 3/2020 | Nieto Avila | B62D 25/12 | |
| 10,648,202 B2 * | 5/2020 | Scholz | E05B 79/08 | |
| 10,655,367 B2 * | 5/2020 | Ferri | B60R 21/34 | |
| 10,704,304 B2 * | 7/2020 | Nelsen | E05B 83/24 | |
| 10,717,407 B2 * | 7/2020 | Szente | E05B 51/023 | |
| 10,800,374 B2 * | 10/2020 | Szente | B60R 21/34 | |
| 2005/0257980 A1 * | 11/2005 | Green | B62D 25/12 | 180/274 |
| 2005/0279550 A1 * | 12/2005 | Saville | B60R 21/38 | 180/69.21 |
| 2006/0170224 A1 * | 8/2006 | Mitchell | E05B 77/04 | 292/216 |
| 2006/0213709 A1 * | 9/2006 | Yamaguchi | F15B 15/19 | 180/69.21 |
| 2010/0244484 A1 * | 9/2010 | Nakaura | B60R 21/38 | 296/187.04 |
| 2012/0074715 A1 * | 3/2012 | Kim | B60R 21/34 | 292/201 |
| 2012/0084942 A1 * | 4/2012 | Mehta | B60R 21/38 | 16/223 |
| 2013/0033069 A1 * | 2/2013 | Hwang | B60R 21/38 | 296/187.04 |
| 2013/0087401 A1 * | 4/2013 | Masih | E05B 17/0062 | 180/274 |
| 2015/0102607 A1 * | 4/2015 | Kim | E05B 83/24 | 292/92 |
| 2015/0167369 A1 * | 6/2015 | Hwang | B60R 21/38 | 16/233 |
| 2016/0129950 A1 * | 5/2016 | Krajenke | E05C 1/002 | 296/37.6 |
| 2017/0327074 A1 * | 11/2017 | Schabenberger | B62D 25/12 | |
| 2018/0044954 A1 * | 2/2018 | Hambusch | E05B 77/08 | |
| 2018/0079385 A1 * | 3/2018 | Henck | E05B 77/08 | |
| 2018/0179788 A1 * | 6/2018 | Oxley | E05C 17/203 | |
| 2019/0338567 A1 * | 11/2019 | Szente | E05B 77/12 | |
| 2020/0232261 A1 * | 7/2020 | Horn | E05B 17/0025 | |
| 2020/0284068 A1 * | 9/2020 | Gumbo | E05B 81/25 | |
| 2020/0362598 A1 * | 11/2020 | Taylor | E05B 81/13 | |

* cited by examiner

VEHICLE POP-UP HOOD APPARATUS

CROSS-REFERENCE TO RELATED APPLICATION

Priority is claimed on Japanese Patent Application No. 2019-027710, filed on Feb. 19, 2019, the contents of which are incorporated herein by reference.

BACKGROUND

Field of the Invention

The present invention relates to a vehicle pop-up hood apparatus in which a hood is displaced upward at the time of an impact input.

Background

As a vehicle hood such as a bonnet hood, a pop-up hood apparatus is known which displaces a hood upward using an actuator at the time of an impact input and flexibly accepts the impact by the hood (for example, refer to Japanese Unexamined Patent Application, First Publication No. 2017-124703).

In the pop-up hood apparatus described in Japanese Unexamined Patent Application, First Publication No. 2017-124703, a hood lock mechanism that fixes a front edge part of the hood to a vehicle body is supported movably upward and downward by the vehicle body via a support mechanism. A pair of actuators are arranged below each of right and left sides of the front edge part of the hood, and when an input of an impact is detected by a sensor, both actuators operate and push the front edge part of the hood upward.

The support mechanism includes a movable block that supports the hood lock mechanism and a base block that supports the movable block such that the movable block is slidable upward and downward, and the base block is fixed to the vehicle body. The movable block is locked and fixed to an initial position by a locking part, and the locking and fixation by the locking part is released when the actuator operates. Thereby, when the actuator operates, the hood lock mechanism is elevated with the hood while keeping the lock state.

A long hole that extends along a vertical direction is formed in the base block of the support mechanism, and a protrusion part that is provided on the movable block so as to protrude is slidably inserted in the long hole. The movable block is displaced upward while the protrusion part is guided by the long hole when the actuator operates.

SUMMARY

However, in the pop-up hood apparatus described in Japanese Unexamined Patent Application, First Publication No. 2017-124703, it is conceivable that, when the movable block is pushed upward by a large force when the actuator operates, the protrusion part may severely hit an upper end part of the long hole. When the impact at this time is large, a load that acts on the support mechanism and a surrounding member becomes large.

An aspect of the present invention provides a vehicle pop-up hood apparatus that is capable of preventing the occurrence of an impact when the movable block of the support mechanism reaches a maximally elevated position when the actuator operates.

A vehicle pop-up hood apparatus according to an aspect of the present invention includes: a hood that closes an opening part at an outer part of a vehicle body; a hood lock mechanism that fixes the hood to the vehicle body in a closed state of the hood; a support mechanism that supports the hood lock mechanism to the vehicle body such that the hood lock mechanism is movable upward and downward; and an actuator that displaces the hood lock mechanism together with the hood upward in an emergency, wherein the support mechanism includes a movable block that supports the hood lock mechanism and a base block that is fixed to the vehicle body and that supports the movable block such that the movable block is slidable upward and downward, the base block has a long hole that extends along a vertical direction, a protrusion part that is slidably inserted in the long hole is provided on the movable block, and a resistance-applying part that comes into contact with the protrusion part and that applies a resistance to the protrusion part is provided in at least a higher region of the long hole than a required elevation position of the hood.

When the actuator operates in an emergency, the movable block of the support mechanism moves upward together with hood lock mechanism. At this time, the protrusion part of the movable block is guided by the long hole of the base block, moves upward, and comes into contact with the resistance-applying part, and thereby, a resistance is applied to the protrusion part. Thereby, the elevation speed of the movable block is gradually decreased. As a result, the occurrence of an impact when the movable block reaches a maximally elevated position is prevented.

A load reception member that receives an operation load of the actuator may be fastened and fixed to the movable block by a bolt, and the protrusion part may be constituted of a shaft part of the bolt.

In this case, since the shaft part of the bolt that fixes the load reception member to the movable block is used as the protrusion part, it is possible to further reduce the number of components provided on the movable block, to reduce the size and weight of the movable block, and to reduce manufacturing costs.

The resistance-applying part may be formed of: a narrow width part having a width that is wider than an outer diameter of the protrusion part and that is narrower than a width of a wide width part of a lower region of the long hole; and a taper part that is arranged between the wide width part and the narrow width part and that has a width which continuously narrows from the wide width part toward the narrow width part.

In this case, when the protrusion part moves upward in the long hole and reaches the taper part, the protrusion part is guided by the taper part and enters the narrow width part. At this time, the protrusion part receives a sliding resistance by coming into contact with walls of the taper part and the narrow width part. Thereby, the elevation speed of the movable block is gradually decreased. In the case of the present configuration, by changing the width of the narrow width part, it is possible to easily adjust the resistance received by the protrusion part when the movable block moves upward.

The resistance-applying part may be constituted of a corrugated groove.

In this case, when the protrusion part moves upward in the long hole and reaches the corrugated groove part, by coming into contact with portions of the corrugated groove that protrude inward, the protrusion part intermittently receives a resistance that prevents the elevation. Thereby, the elevation speed of the movable block is gradually decreased. In the case of the present configuration, by changing the corrugation pitch of the groove or the spacing between protrusion parts of the groove, it is possible to easily adjust the resistance received by the protrusion part when the movable block moves upward.

The resistance-applying part may be constituted of a narrow width part having a width at the narrowest portion that is narrower than an outer diameter of the protrusion part and a lightening hole that is provided on an edge portion of the narrow width part.

In this case, when the protrusion part moves upward in the long hole and reaches the narrow width part, the protrusion part moves upward while pushing and widening the narrow width part. At this time, the narrow width part is deformed toward the lightening hole. Then, the protrusion part receives a resistance from the narrow width part when the protrusion part moves upward while pushing and widening the narrow width part. Thereby, the elevation speed of the movable block is gradually decreased. In the case of the present configuration, by changing the shape or position of the lightening hole that is formed on the edge portion of the narrow width part, it is possible to easily adjust the resistance that is received by the protrusion part when the movable block moves upward.

The resistance-applying part may be constituted of a deformable protrusion piece that extends from an edge part of the long hole toward an inside of the long hole.

In this case, when the protrusion part moves upward in the long hole and reaches the protrusion piece, the protrusion piece is pressed by the protrusion part and is deformed and flexed, and at this time, the protrusion part receives a resistance. Thereby, the elevation speed of the movable block is gradually decreased. In the case of the present configuration, by changing the thickness or shape of the protrusion piece, it is possible to easily adjust the resistance that is received by the protrusion part when the movable block moves upward.

According to the aspect of the present invention, when the protrusion part of the movable block moves upward in the long hole during operation of the actuator, the protrusion part receives a resistance by coming into contact with the resistance-applying part, and the elevation speed of the movable block is decreased. Therefore, according to the aspect of the present invention, it is possible to prevent the occurrence of an impact when the movable block reaches a maximally elevated position when the actuator operates.

Further, in the pop-up hood apparatus according to the aspect of the present invention, since the resistance-applying part is provided on the long hole of the base block, addition of a component or the like is not required, and it is possible to reduce the size and weight of the apparatus by the amount of the component and reduce manufacturing costs.

DESCRIPTION OF EMBODIMENTS

Hereinafter, embodiments of the present invention will be described with reference to the drawings. In the following descriptions, frontward, rearward, upward, downward, rightward, and leftward directions mean frontward, rearward, upward, downward, rightward, and leftward directions of a vehicle, unless otherwise specified. In an appropriate position of the drawings, an arrow UP that indicates an upward direction of the vehicle, an arrow FR that indicates a frontward direction of the vehicle, and an arrow LH that indicates a left side direction of the vehicle are shown.

(Vehicle Configuration)

Figure 1:
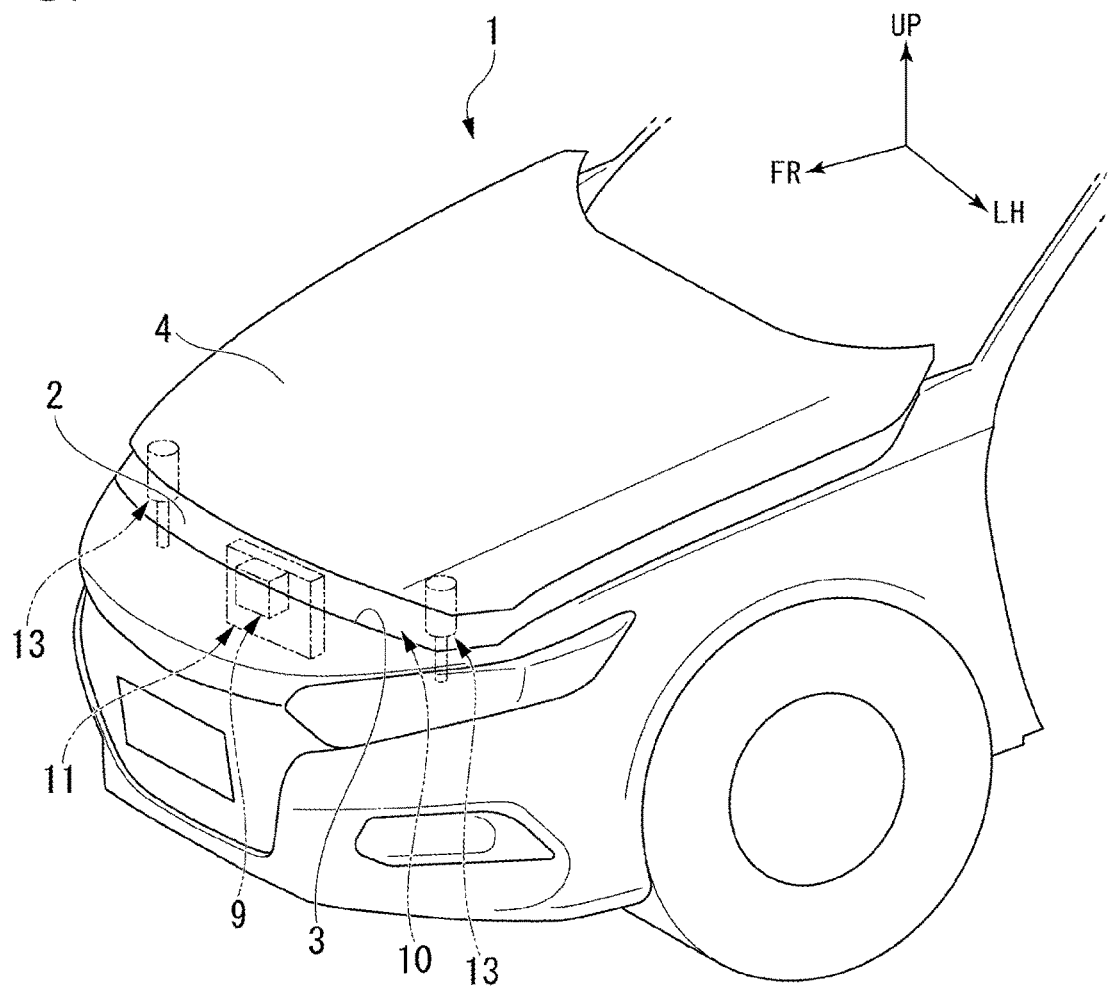
FIG. 1 is a perspective view showing a state in which a vehicle pop-up hood apparatus according to an embodiment is operated.
Figure 2:
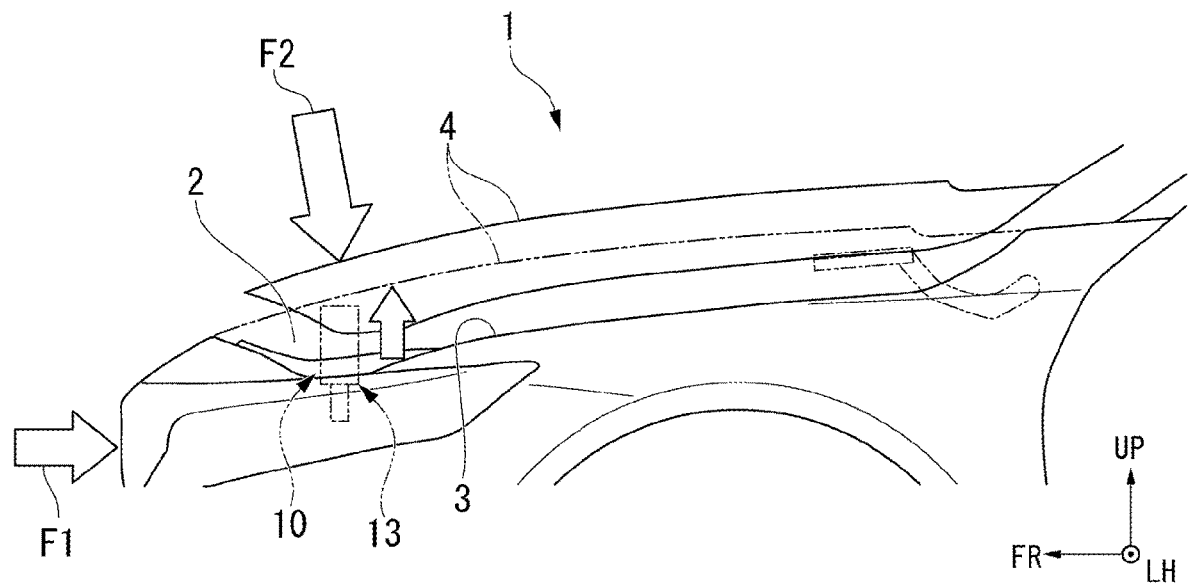
FIG. 2 is a side view showing a state in which the vehicle pop-up hood apparatus according to the embodiment is operated.
Figure 3:
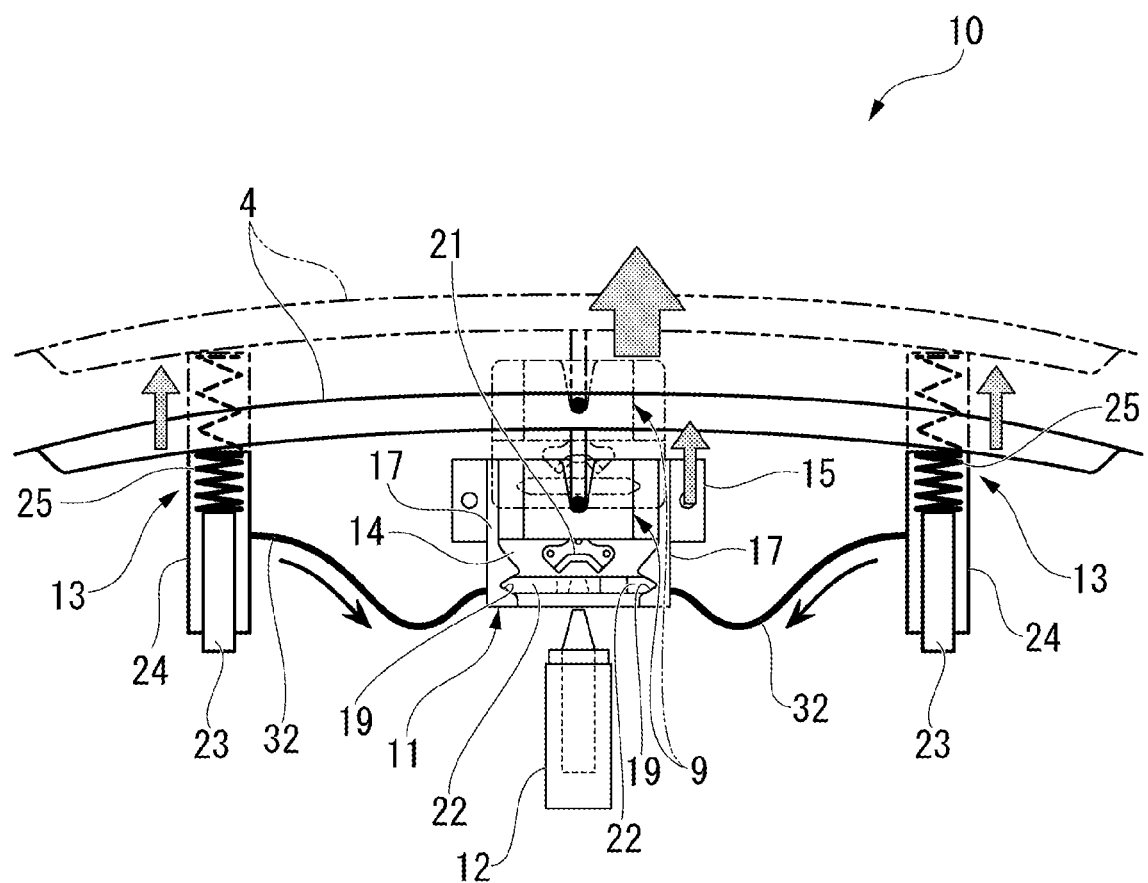
FIG. 3 is a front view showing a schematic configuration of the pop-up hood apparatus according to the embodiment.

FIG. 1 is a perspective view of a front part of a vehicle 1 according to the embodiment seen from a frontward upward direction. FIG. 2 is a left side view of the front part of the vehicle 1. FIG. 3 is a front view showing a schematic configuration of a pop-up hood apparatus 10 that is provided on the front part of the vehicle 1.

The vehicle 1 includes a drive room 2 in which a drive source such as an engine or a motor is arranged in front of a vehicle room. An opening part 3 having a substantially rectangular shape is provided on an upper part of the drive room 2. The opening part 3 is closed by a hood 4 such that the opening part 3 is openable and closeable. The hood 4 is, for example, formed by bonding a plurality of metal plates and has a substantially hollow structure. A hinge (not shown) is attached to right and left side edge parts close to a rear portion of the opening part 3 of the vehicle body. A movable piece of the hinge is connected to right and left side edge portions of a rear part of the hood 4. The hood 4 is openable and closeable toward a forward direction with respect to the opening part 3 around a rotation axis of the right and left hinges in normal use.

A hood lock mechanism 9 is provided on a front middle portion of the opening part 3 of the vehicle body. The hood lock mechanism 9 fixes a front part of the closed hood 4 to the vehicle body and maintains a lock state. The lock of the hood lock mechanism 9 can be released by a lever operation from the inside of a vehicle room or the like.

In the vehicle 1 of the present embodiment, the drive room 2 is arranged on the front part of the vehicle body, and the opening part 3 above the drive room 2 is closed by the hood 4; however, a similar structure can be applied to a vehicle in which a luggage room is arranged on the front part of the vehicle body, and an opening part above the luggage room is closed by a hood.

(Pop-Up Hood Apparatus)

The pop-up hood apparatus 10 includes the hood 4, the hood lock mechanism 9, a support mechanism 11 that supports the hood lock mechanism 9 to the vehicle body such that the hood lock mechanism 9 is movable upward and downward, an actuator 12 that displaces a front middle area of the hood 4 upward in an emergency (at the time of input of an impact F1), and a pair of auxiliary support parts 13 that support right and left side edge parts close to a front part of the hood 4 from below when the actuator 12 operates.

Figure 4:
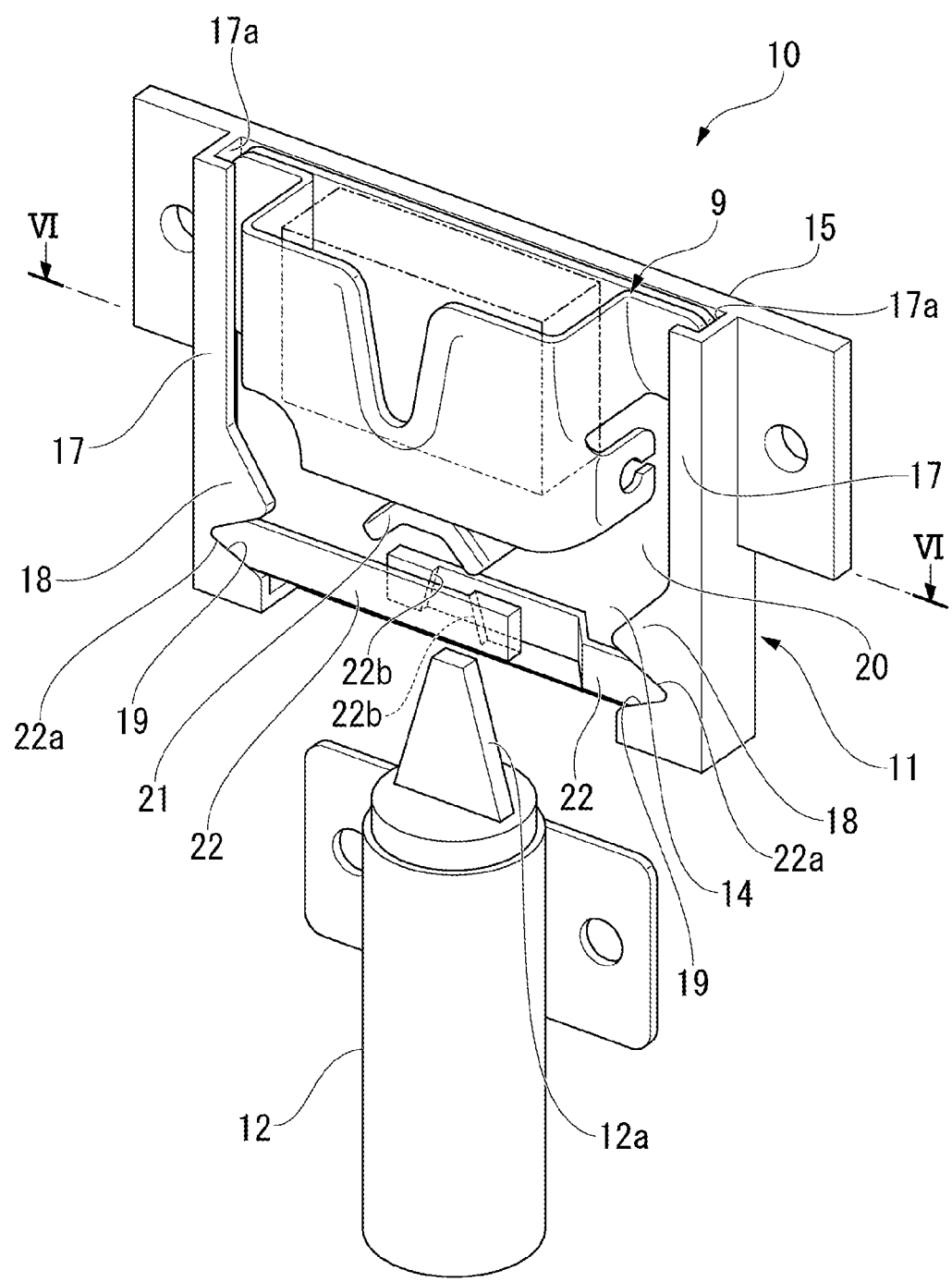
FIG. 4 is a perspective view showing part of the pop-up hood apparatus according to the embodiment.
Figure 5:
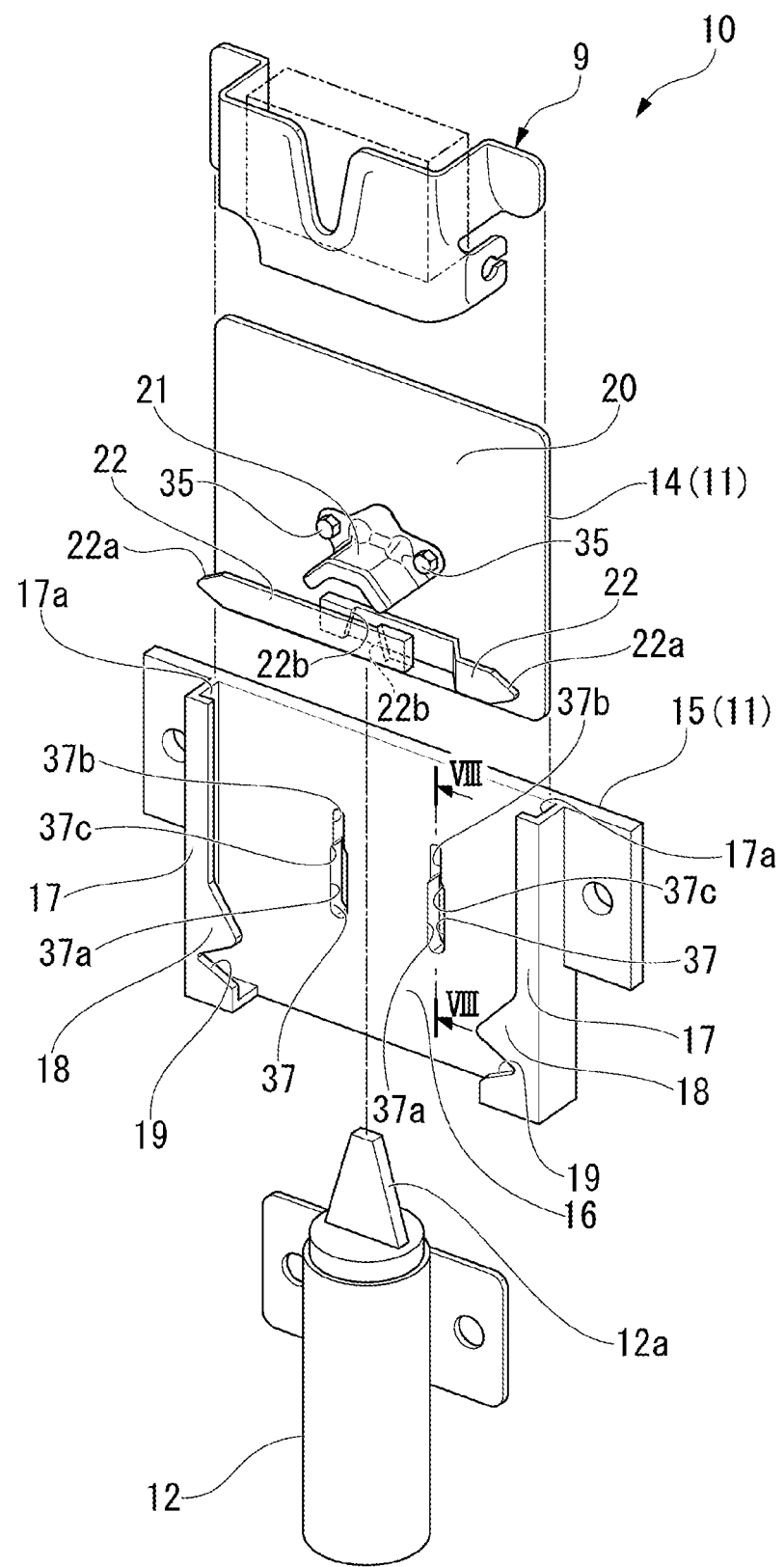
FIG. 5 is an exploded perspective view of part of the pop-up hood apparatus according to the embodiment.
Figure 6:
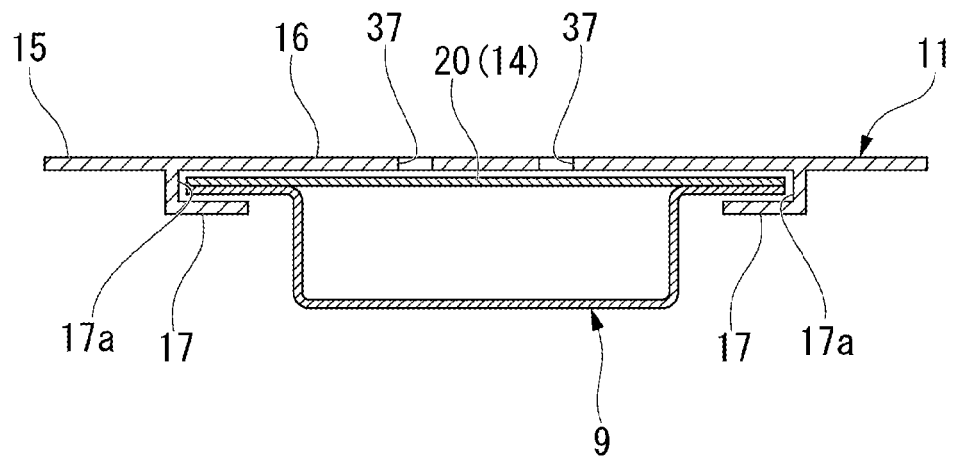
FIG. 6 is a cross-sectional view along a VI-VI line of FIG. 4 of the pop-up hood apparatus according to the embodiment.

FIG. 4 is a perspective view of the support mechanism 11 that supports the hood lock mechanism 9 and the actuator 12. FIG. 5 is a view showing a disassembled support mechanism 11 together with the hood lock mechanism 9 and the actuator 12. FIG. 6 is a cross-sectional view along a VI-VI line of FIG. 4 of the support mechanism 11.

The support mechanism 11 includes a movable block 14 that supports the hood lock mechanism 9 and a base block 15 that is fixed to a substantially middle portion in a vehicle width direction of the front part of the vehicle body and that supports the movable block 14 such that the movable block 14 is slidable in a vertical direction.

The base block 15 includes a fixation base wall 16 that is fixed to a skeleton member at the front part of the vehicle body by bolt fastening or the like, and a pair of right and left guide rail parts 17 that are provided to protrude on a front surface of the fixation base wall 16. The right and left guide rail parts 17 are formed such that guide grooves 17a substantially along the vertical direction face each other in the vehicle width direction. A projection part 18 that protrudes inward in the vehicle width direction is provided in the vicinity of a lower end of each of the right and left guide rail parts 17, and an engagement groove 19 that is recessed in a substantially V-shape is formed on an inner edge portion in the vehicle width direction of the projection part 18.

The movable block 14 includes a movable base wall 20 having right and left side edge parts that are slidably supported by the right and left guide rail parts 17 of the base block 15, a load reception member 21 that is arranged and fixed to a middle part in the vehicle width direction of a front surface of the movable base wall 20, and a pair of right and left locking claws 22 that are supported on the front surface of the movable base wall 20 at a lower position than the load reception member 21 such that the right and left locking claws 22 are slidable in the vehicle width direction.

The load reception member 21 is a member with which a wedge part 12a at an upper end of a movable part of the actuator 12 comes into contact and which receives a push-up load from the actuator 12. The push-up load is applied to the load reception member 21 from the actuator 12, and thereby, the movable base wall 20 is guided by the right and left guide rail parts 17 and displaces upward.

The locking claw 22 includes a locking part 22a that has a substantially triangular shape and that is inserted into and engaged with a corresponding engagement groove 19 of the right and left guide rail parts 17. Each locking claw 22 is biased by a spring (not shown) in a direction in which the locking part 22a is inserted into the corresponding engagement groove 19. A cam surface 22b that is sloped outward in the vehicle width direction from an upper end side toward a lower end side is provided on each locking claw 22. A sloped portion of the wedge part 12a comes into slidable contact with each cam surface 22b when the wedge part 12a of the actuator 12 moves upward at the time of operation of the actuator 12. Each locking claw 22 slides in a direction away from the engagement groove 19 by the sloped cam surface 22b being pressed by the sloped portion of the wedge part 12a. Thereby, the locking part 22a of the locking claw 22 is removed from the corresponding engagement groove 19, and the locking of the movable block 14 is released.

The actuator 12 is constituted of, for example, a powder-operation-type cylinder device which receives a signal from a controller (not shown) and of which a rod part protrudes or the like. In the present embodiment, when an impact detection sensor (not shown) (for example, an acceleration sensor) that is provided on a front bumper or the like detects a predetermined impact or more, the controller outputs an operation signal to the actuator 12. The rod part of the actuator 12 protrudes by a powder operation or the like, and thereby, the wedge part 12a at a front end of the actuator 12 releases the locking of the movable block 14 described above and pushes up the movable block 14 via the load reception member 21.

As shown in FIG. 3, the auxiliary support part 13 includes a support rod 23 having a cylindrical shape, a load reception block 24 which has a cylindrical shape having a bottom and which is externally fitted into the support rod 23 such that the load reception block 24 is movable upward and downward, and a spring 25 that is provided between the support rod 23 and the load reception block 24 and that biases the load reception block 24 upward. The support rod 23 is attached to the skeleton member at the front part of the vehicle body via a bracket (not shown). The load reception block 24 has a top part having a shape capable of coming into contact with a lower surface of the side edge part of the hood 4.

A displacement regulation member (not shown) that regulates an upward displacement from an initial position (lower position) of the load reception block 24 against a biasing force of the spring 25 is provided on the auxiliary support part 13. The displacement control member is operable in an interlocking manner with the movable block 14 of the support mechanism 11 via an operation cable 32 and a cable retraction lever (not shown). Specifically, when the movable block 14 is displaced upward in association with the operation of the actuator 12, the cable retraction lever retracts the operation cable 32 in accordance with the upward displacement of the movable block 14. Then, when the operation cable 32 is retracted, the operation cable 32 displaces the displacement regulation member in a regulation release direction. As a result, the load reception block 24 of which the displacement has been regulated by the displacement regulation member receives a biasing force of the spring 25, moves upward, pushes up the side edge part of the hood 4 from below, and supports the side edge part of the hood 4 from below.

Figure 7:
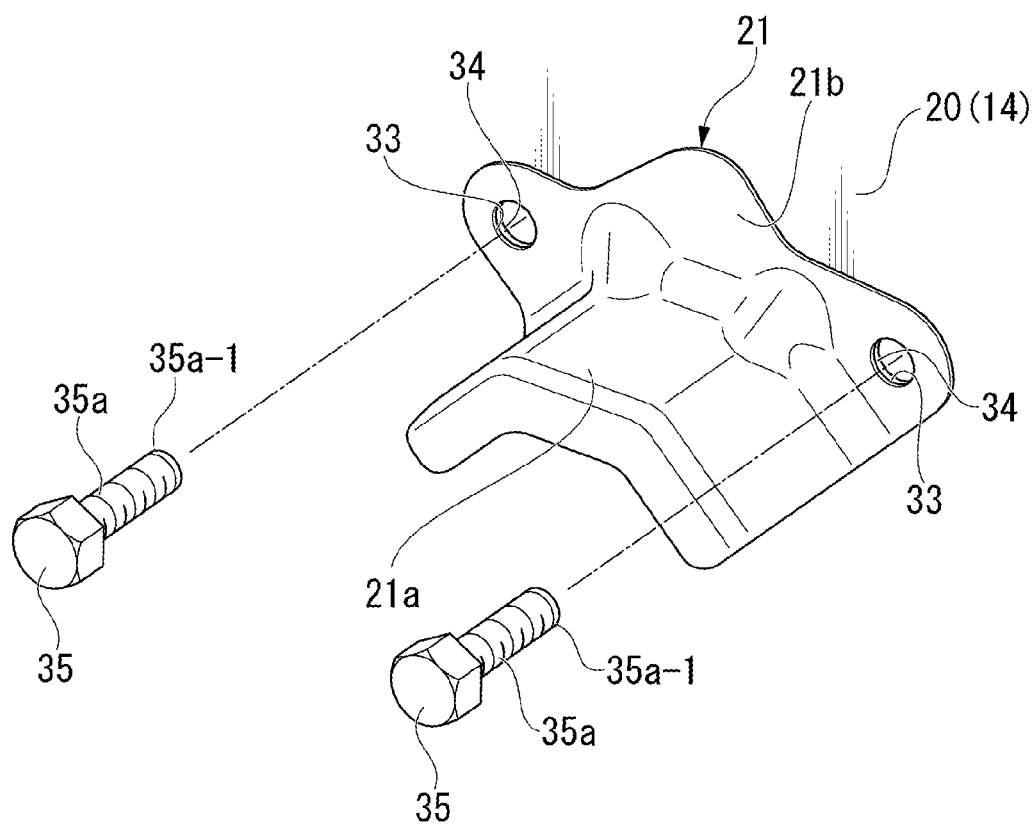
FIG. 7 is a perspective view showing a shape and attachment configuration of a load reception member according to the embodiment.
Figure 8:
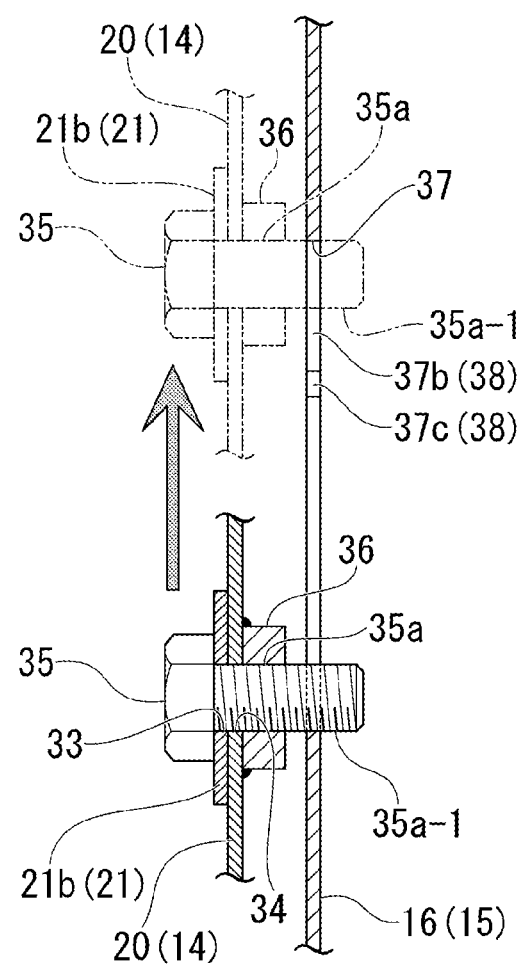
FIG. 8 is a cross-sectional view corresponding to a VIII-VIII cross-section of FIG. 5 of a support mechanism according to the embodiment.

FIG. 7 is a view showing a specific shape of the load reception member 21 and an attachment configuration of the load reception member 21 with respect to the movable base wall 20 (movable block 14). FIG. 8 is a cross-sectional view corresponding to a VIII-VIII cross-section of FIG. 5.

As shown in FIG. 7, the load reception member 21 includes a load reception wall 21a having a U shape in a front view and a flange wall 21b that is connected to a base part of the load reception wall 21a. The load reception wall 21a has, on the lower surface side, a recess part that is capable of accepting the wedge part 12a of the actuator 12. The flange wall 21b is formed to be bent substantially perpendicularly with respect to the load reception wall 21a. A pair of bolt insertion holes 33 are formed at right and left separate positions of the flange wall 21b. The pair of bolt insertion holes 33 are formed at right and left positions that are symmetrical with respect to the center position in the vehicle width direction of the load reception member 21.

In the present embodiment, the pair of bolt insertion holes 33 are laterally symmetrically formed on the load reception member 21; however, the bolt insertion holes 33 do not necessarily need to be laterally symmetrically formed on the load reception member 21. The number of the bolt insertion hole 33 and the number of a bolt 35 that is inserted in the bolt insertion hole 33 may be one, or three or more.

As shown in FIG. 8, a similar bolt insertion hole 34 corresponding to the bolt insertion hole 33 of the load reception member 21 is formed on the attachment part of the load reception member 21 of the movable base wall 20. A shaft part 35a of the bolt 35 is inserted in the bolt insertion hole 33 of the load reception member 21 and the bolt insertion hole 34 of the movable base wall 20, and the shaft part 35a of the bolt 35 is tightened to a weld nut 36 that is fixed to a rear surface of the movable base wall 20. The load reception member 21 is fastened and fixed to the movable base wall 20 by tightening the bolt 35 to the weld nut 36.

As shown in FIG. 8, a front end portion of the shaft part 35a of the bolt 35 that is fastened to the weld nut 36 protrudes by a predetermined amount further rearward than the weld nut 36. Hereinafter, a portion of the shaft part 35a of the bolt 35 that protrudes to the back side of the movable base wall 20 from the weld nut 36 is referred to as a protrusion part 35a-1.

On the other hand, as shown in FIG. 5 and FIG. 8, a pair of long holes 37 that extend along the vertical direction are formed on the fixation base wall 16 of the base block 15. Each long hole 37 is provided so as to correspond to a protrusion position of the protrusion part 35a-1 of the bolt 35, and the protrusion part 35a-1 of the corresponding bolt 35 is inserted in the long hole 37. Each protrusion part 35a-1 is inserted in the long hole 37 such that the protrusion part 35a-1 is slidable in the vertical direction. The protrusion part 35a-1 slides in the corresponding long hole 37 and moves upward when the movable block 14 moves upward while being guided by the guide rail part 17 of the base block 15 by the operation of the actuator 12.

(Long Hole Structure of First Embodiment)

Figure 9:
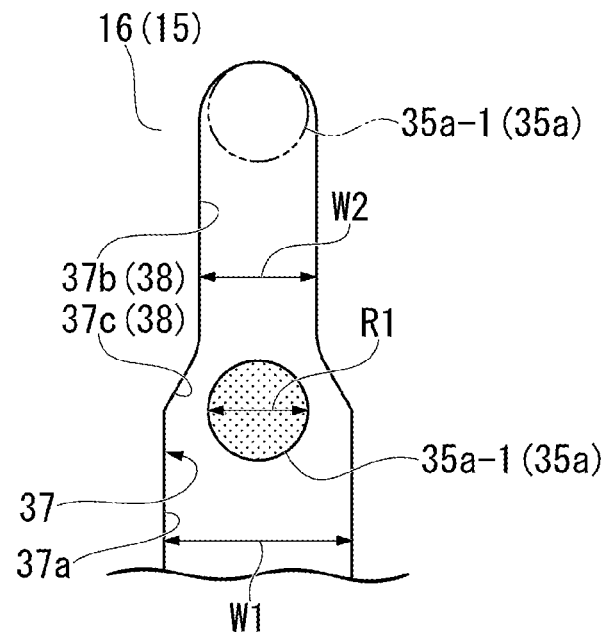
FIG. 9 is a front view of a base block showing a detailed shape of a long hole part according to a first embodiment.

FIG. 9 is a front view of the fixation base wall 16 (base block 15) showing a detailed shape of the long hole 37 of the first embodiment.

The long hole 37 of the present embodiment is formed in a constant width W1 that is wider than an outer diameter of the protrusion part 35a-1 of the bolt 35 from a lower end region to a predetermined region on the upper end side. Hereinafter, this part is referred to as a wide width part 37a. A higher part of the long hole 37 than the predetermined area on the upper end side is a narrow width part 37b having a width W2 that is wider than an outer diameter R1 of the protrusion part 35a-1 of the bolt 35 and narrower than the width W1 of the wide width part 37a. A part between the wide width part 37a and the narrow width part 37b is a taper part 37c having a width that continuously narrows from the wide width part 37a toward the narrow width part 37b. In the present embodiment, the resistance-applying part 38 is constituted of the narrow width part 37b and the taper part 37c.

The taper part 37c and the narrow width part 37b (resistance-applying part 38) are formed in a higher region of the long hole 37 than a required elevation position in an emergency of the hood 4. In the present embodiment, a lower end position of the taper part 37c is the required elevation position of the hood 4. However, the resistance-applying part 38 (the taper part 37c and the narrow width part 37b) may be formed from a lower position than the required elevation position of the hood 4.

When the movable block 14 moves upward by the operation of the actuator 12, accordingly, the protrusion part 35a-1 of the bolt 35 moves upward in the long hole 37 and comes into contact with the resistance-applying part 38 (the taper part 37c and the narrow width part 37b), and thereby, a sliding resistance is applied from the resistance-applying part 38 to the protrusion part 35a-1 of the bolt 35.

(Operation of Pop-Up Hood Apparatus)

As shown in FIG. 2, when a large impact F2 is input to the upper surface of the hood 4 from above after an impact F1 is input to the front bumper during traveling of the vehicle 1, the pop-up hood apparatus 10 operates as described below.

First, when the impact F1 is input to the front bumper, an impact detection sensor detects the input of the impact F1, and the actuator 12 at the front middle part of the vehicle body operates on the basis of a command from the controller. When the actuator 12 operates, the wedge part 12a of the actuator 12 passes between the pair of locking claws 22 of the support mechanism 11 and slides the locking claw 22 in a locking release direction at that time. Thereby, the locking of the movable block 14 by the locking claw 22 is released, and an upward displacement of the movable block 14 becomes possible. After passing between the pair of locking claws 22, the wedge part 12a of the actuator 12 comes into contact with the load reception member 21 from below and pushes the movable block 14 upward via the load reception member 21. As a result, the hood lock mechanism 9 that is supported by the movable block 14 moves upward together with the hood 4.

On the other hand, when the movable block 14 begins to move upward due to the push-up by the actuator 12, accordingly, a cable retraction lever (not shown) is pivotally driven, and the operation cable 32 is retracted. Thereby, the displacement regulation member (not shown) of the right and left auxiliary support parts 13 releases an upward displacement regulation of the load reception block 24. As a result, the load reception block 24 moves upward in response to a biasing force of the spring 25 and supports the side edge part of the hood 4 from below in accordance with the elevation of the hood 4.

When the movable block 14 is pushed upward via the load reception member 21 by the operation of the actuator 12, the protrusion part 35a-1 of the bolt 35 that protrudes from the movable block 14 moves upward in the long hole 37 of the base block 15. Then, when the protrusion part 35a-1 moves upward together with the movable block 14 to the required elevation position of the hood 4, the protrusion part 35a-1 is guided by the taper part 37c and enters the narrow width part 37b in the long hole 37. At this time, by coming into contact with the taper part 37c and the narrow width part 37b, the protrusion part 35a-1 receives a sliding resistance, and the elevation speed of the movable block 14 is gradually reduced. Therefore, an over-stroke of the hood 4 above the required elevation position is promptly prevented, and the protrusion part 35a-1 is prevented from severely colliding with an upper end part of the long hole 37.

The hood 4 is then held at a height above the required elevation position. In this state, when a large impact F2 is input to the upper surface of the hood 4 from above, the impact F2 is flexibly absorbed by deformation of the hood 4 and a support part of the hood 4.

Effect of Embodiment

As described above, in the pop-up hood apparatus 10 of the present embodiment, when the protrusion part 35a-1 of the movable block 14 moves upward in the long hole 37 at the time of operation of the actuator 12, the protrusion part 35a-1 receives a resistance by coming into contact with the resistance-applying part 38 (the taper part 37c and the narrow width part 37b), and the elevation speed of the movable block 14 is reduced. Accordingly, in a case where the pop-up hood apparatus 10 of the present embodiment is employed, when the actuator 12 operates, it is possible to prevent the occurrence of an impact when the movable block 14 reaches a maximally elevated position.

Further, since the pop-up hood apparatus 10 of the present embodiment has a structure in which the resistance-applying part 38 is formed in the long hole 37 of the base block 15, and a sliding resistance is applied to the protrusion part 35a-1 by the resistance-applying part 38 in the long hole 37, addition of a component or the like is not required, and it is possible to reduce the size and weight of the apparatus by the amount of the component and reduce manufacturing costs.

In particular, since in the pop-up hood apparatus 10 of the present embodiment, the protrusion part 35a-1 is constituted of the shaft part 35a of the bolt 35 that fastens and fixes the load reception member 21 to the movable block 14, it is possible to further reduce the number of components provided on the movable block 14, to further reduce the size and weight of the apparatus, and to reduce manufacturing costs.

Further, in the pop-up hood apparatus 10 of the present embodiment, the resistance-applying part 38 is constituted of the taper part 37c and the narrow width part 37b formed in the long hole 37. The narrow width part 37b is formed in the width W2 that is wider than the outer diameter of the protrusion part 35a-1 and narrower than the width W1 of the wide width part 37a of the lower region of the long hole 37, and the taper part 37c is formed such that the width is continuously narrowed from the wide width part 37a toward the narrow width part 37b. Therefore, in a case where the configuration of the present embodiment is employed, it is possible to smoothly apply the sliding resistance to the protrusion part 35a-1 when the actuator 12 operates although the structure is extremely simple.

In the pop-up hood apparatus 10 of the present embodiment, by changing the width W2 of the narrow width part 37b, it is possible to easily adjust the sliding resistance applied to the protrusion part 35a-1 when the movable block moves upward.

(Long Hole Structure of Second Embodiment)

Figure 10:
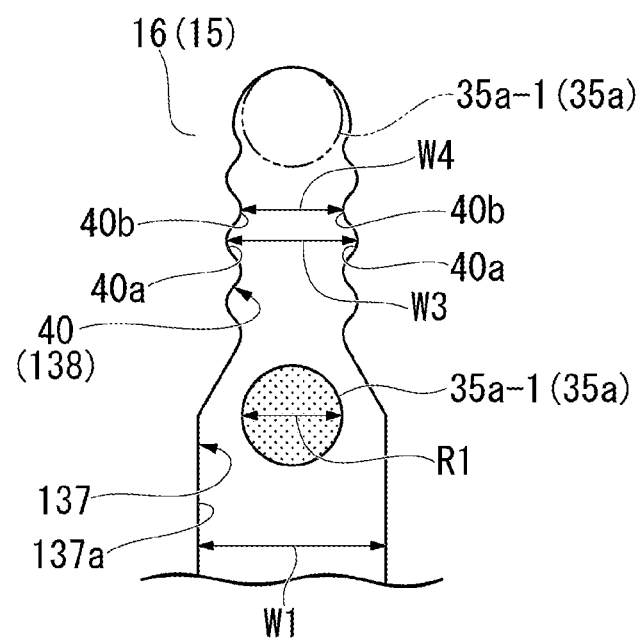
FIG. 10 is a front view of a base block showing a detailed shape of a long hole part according to a second embodiment.

FIG. 10 is a front view of a fixation base wall 16 (base block 15) showing a detailed shape of a long hole 137 of a second embodiment.

The long hole 137 of the present embodiment is formed in a constant width W1 that is wider than an outer diameter of the protrusion part 35a-1 of the bolt 35 from a lower end region to a predetermined region on the upper end side, and this part is a wide width part 137a. A corrugated groove 40 is formed above the predetermined region of the long hole 137. A width W3 of a recess part 40a of the corrugated groove 40 is formed to be narrower than a width of the wide width part 137a, and a width W4 of a protrusion part 40b of the corrugated groove 40 is formed to be narrower than the width W3 of the recess part 40a. However, the width W4 of the protrusion part 40b is formed to be slightly wider than an outer diameter R1 of the protrusion part 35a-1 of the bolt.

In the present embodiment, the resistance-applying part 138 is constituted of the corrugated groove 40 formed in the long hole 137. The corrugated groove 40 (resistance-applying part 138) is formed in at least a higher region of the long hole 137 than the required elevation position of the hood.

In the case of the present embodiment, when the protrusion part 35a-1 moves upward in the long hole 137 by the operation of the actuator, and the protrusion part 35a-1 reaches the corrugated groove 40 part, the protrusion part 35a-1 intermittently receives a resistance that prevents the upward movement by coming into contact with the protrusion part 40b of the corrugated groove 40. Thereby, in the present embodiment, the elevation speed of the movable block is gradually reduced, and it is possible to reduce the impact when the movable block reaches the elevation end.

The pop-up hood apparatus of the present embodiment has an advantage in that since the resistance-applying part 138 is constituted of the corrugated groove 40, it is possible to relatively easily adjust the resistance applied to the protrusion part 35a-1 by changing the pitch of the corrugation of the groove 40 and the spacing between the protrusion parts 40b.

(Long Hole Structure of Third Embodiment)

Figure 11:
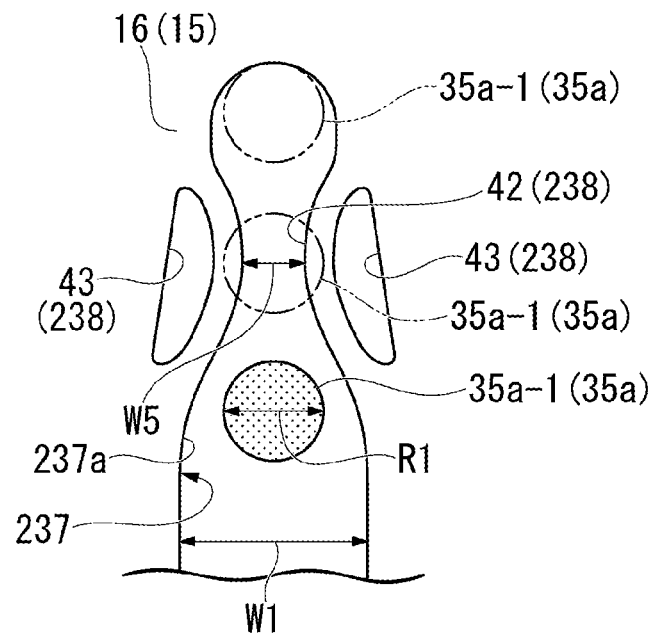
FIG. 11 is a front view of a base block showing a detailed shape of a long hole part according to a third embodiment.

FIG. 11 is a front view of a fixation base wall 16 (base block 15) showing a detailed shape of a long hole 237 of a third embodiment.

The long hole 237 of the present embodiment is formed in a constant width W1 that is wider than an outer diameter of the protrusion part 35a-1 of a bolt from a lower end region to a predetermined region on the upper end side, and this part is a wide width part 237a. A narrow width part 42 having a width W5 at the narrowest portion that is narrower than an outer diameter R1 of the protrusion part 35a-1 of the bolt 35 is formed above the predetermined region of the long hole 237. In the narrow width part 42, right and left side walls are formed in an arc shape, and a width W5 at a middle position in the vertical direction is the narrowest. A lightening hole 43 is formed on right and left side edge portions of the narrow width part 42 of the fixation base wall 16 along the arc shape of the narrow width part 42.

In the present embodiment, a resistance-applying part 238 is constituted of the narrow width part 42 and the lightening hole 43. The narrow width part 42 (resistance-applying part 238) is formed in at least a higher region of the long hole 237 than the required elevation position of a hood.

In the case of the present embodiment, when the protrusion part 35a-1 of the bolt moves upward in the long hole 237 by the operation of the actuator, and the protrusion part 35a-1 reaches the narrow width part 42, the protrusion part 35a-1 moves upward while pushing and widening the narrow width part 42 in the right and left lightening holes 43 directions. At this time, the protrusion part 35a-1 receives a large sliding resistance from the narrow width part 42. Thereby, in the present embodiment, the elevation speed of the movable block is gradually reduced, and it is possible to reduce the impact when the movable block reaches the elevation end.

In the pop-up hood apparatus of the present embodiment, it is possible to easily adjust a sliding resistance applied to the protrusion part 35a-1 when the movable block moves upward by changing the shape or position of the lightening hole 43 formed on the edge portion of the narrow width part 42.

(Long Hole Structure of Fourth Embodiment)

Figure 12:
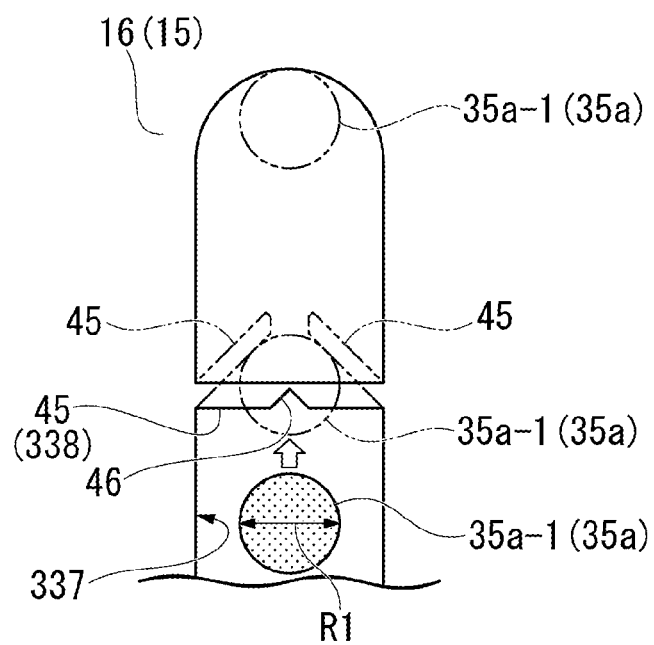
FIG. 12 is a front view of a base block showing a detailed shape of a long hole part according to a fourth embodiment.

FIG. 12 is a front view of a fixation base wall 16 (base block 15) showing a detailed shape of a long hole 337 of a fourth embodiment.

The long hole 337 of the present embodiment is formed in a constant width from a lower end region to an upper end region that is wider than an outer diameter R1 of the protrusion part 35a-1 of the bolt 35. A protrusion piece 45 having a plate shape is provided at a predetermined position (required elevation position of the hood) in the long hole 337 so as to connect right and left side walls of the long hole 337. The protrusion piece 45 is integrally formed on right and left side edge parts of the long hole 337. A notch part 46 having a substantially triangular shape is formed on a lower surface side of a middle part of the protrusion piece 45.

In the present embodiment, the resistance-applying part 338 is constituted of the protrusion piece 45.

In the case of the present embodiment, when the protrusion part 35a-1 of the bolt 35 moves upward in the long hole 337 by the operation of the actuator, and the protrusion part 35a-1 reaches the protrusion piece 45, the protrusion piece 45 is pressed upward by the protrusion part 35a-1, and thereby, the protrusion piece 45 breaks the notch part 46 at the center. Then, when the protrusion part 35a-1 moves further upward, the protrusion piece 45 broken from the central portion is gradually bent and deformed, and at this time, the protrusion part 35a-1 receives a resistance associated with the deformation of the protrusion piece 45. Thereby, in the present embodiment, the elevation speed of the movable block is gradually reduced, and it is possible to reduce the impact when the movable block reaches the elevation end.

In the pop-up hood apparatus of the present embodiment, it is possible to easily adjust a sliding resistance applied to the protrusion part 35a-1 when the movable block moves upward by changing the thickness of the protrusion piece 45, or the shape or depth of the notch part 46.

The present invention is not limited to the above-described embodiments, and various design changes can be made without departing from the scope of the invention.

What is claimed is:

1. A vehicle pop-up hood apparatus, comprising:
   a hood that closes an opening part at an outer part of a vehicle body;
   a hood lock mechanism that fixes the hood to the vehicle body in a closed state of the hood;
   a support mechanism that supports the hood lock mechanism to the vehicle body such that the hood lock mechanism is movable upward and downward; and
   an actuator that displaces the hood lock mechanism together with the hood upward in an emergency,
   wherein the support mechanism includes
      a movable block that supports the hood lock mechanism and
      a base block that is fixed to the vehicle body and that supports the movable block such that the movable block is slidable upward and downward,
   the base block has a long hole that extends along a vertical direction,
   a protrusion part that is slidably inserted in the long hole is provided on the movable block,
   a resistance-applying part that comes into contact with the protrusion part and that applies a resistance to the protrusion part is provided in at least a higher region of the long hole than a required elevation position of the hood,
   a load reception member that receives an operation load of the actuator is fastened and fixed to the movable block by a bolt, and
   the protrusion part is constituted of a shaft part of the bolt.

2. The vehicle pop-up hood apparatus according to claim 1,
   wherein the resistance-applying part is formed of: a narrow width part having a width that is wider than an outer diameter of the protrusion part and that is narrower than a width of a wide width part of a lower region of the long hole; and a taper part that is arranged between the wide width part and the narrow width part and that has a width which continuously narrows from the wide width part toward the narrow width part.

3. The vehicle pop-up hood apparatus according to claim 1,
   wherein the resistance-applying part is constituted of a corrugated groove.

4. The vehicle pop-up hood apparatus according to claim 1,
   wherein the resistance-applying part is constituted of a narrow width part having a width at the narrowest portion that is narrower than an outer diameter of the protrusion part and a lightening hole that is provided on an edge portion of the narrow width part.

5. The vehicle pop-up hood apparatus according to claim 1,
   wherein the resistance-applying part is constituted of a deformable protrusion piece that extends from an edge part of the long hole toward an inside of the long hole.

* * * * *